United States Patent [19]

Nesson et al.

[11] 4,096,495
[45] Jun. 20, 1978

[54] IRIS CONTROL

[75] Inventors: Israel Nesson, Fair Lawn; Edwin E. Faris, Wyckoff; Robert G. Palmer, Wayne, all of N.J.

[73] Assignee: Berkey Photo, Inc., Paramus, N.J.

[21] Appl. No.: 587,036

[22] Filed: Jun. 16, 1975

Related U.S. Application Data

[62] Division of Ser. No. 296,591, Oct. 11, 1972, abandoned.

[51] Int. Cl.² .................... G03B 7/00; G03B 9/04
[52] U.S. Cl. ........................ 354/59; 354/49; 354/270
[58] Field of Search .............. 354/270, 274, 230, 196, 354/247, 246, 59, 42, 49; 352/141

[56] References Cited

U.S. PATENT DOCUMENTS

| | | | |
|---|---|---|---|
| 317,788 | 5/1885 | Hoover | 354/247 |
| 3,442,194 | 5/1969 | Sho | 354/274 X |
| 3,446,133 | 5/1969 | Starp | 354/274 |
| 3,478,660 | 11/1969 | Land | 354/196 X |
| 3,589,258 | 6/1971 | Koeber | 352/141 X |
| 3,783,761 | 1/1974 | Schild et al. | 352/141 X |
| 3,810,207 | 5/1974 | Muellen | 352/141 X |
| 3,846,807 | 11/1974 | Sekine | 352/141 |
| 3,916,425 | 10/1975 | Tanaka | 354/196 |

*Primary Examiner*—Edna M. O'Connor
*Attorney, Agent, or Firm*—Neuman, Williams, Anderson & Olson

[57] ABSTRACT

A camera is provided with a scissors-type iris having apertures of different shapes and areas formed by the pair of blades. In one mode of operation, with a "flash" setting, a control mechanism automatically adjusts the iris opening in accordance with the focus distance setting and further compensates the iris opening in accordance with an image brightness adjustment. The iris adjustment mechanism automatically is adjusted to certain predetermined positions when the controls are set for other modes of operation, and exposure is then controlled by an electronic shutter timing mechanism which may be varied by a sliding vane brightness adjustment.

5 Claims, 13 Drawing Figures

U.S. Patent June 20, 1978 Sheet 1 of 5 4,096,495
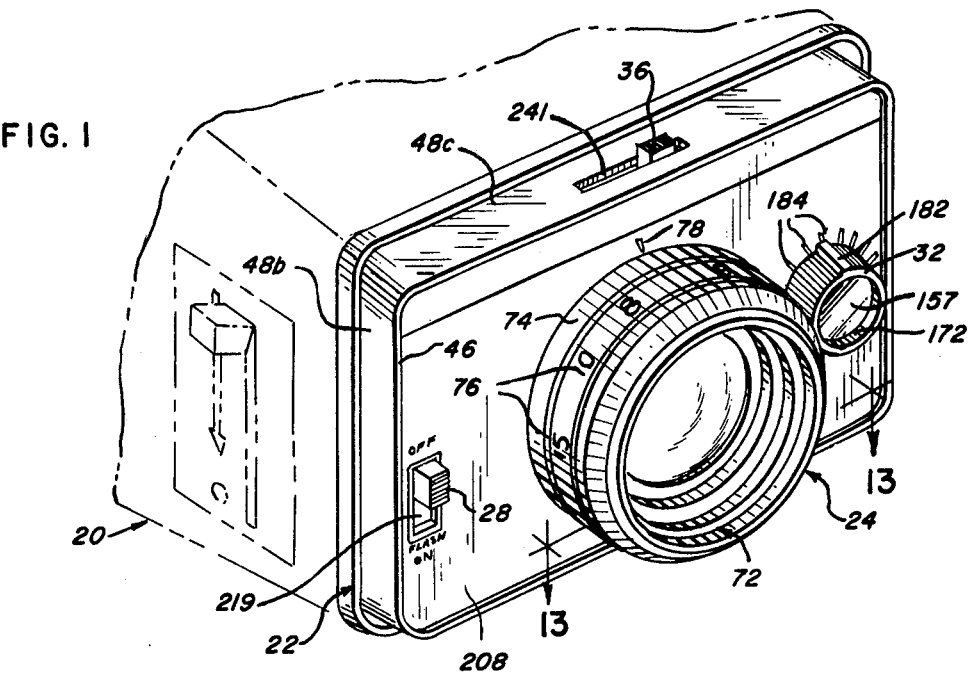
FIG. 1
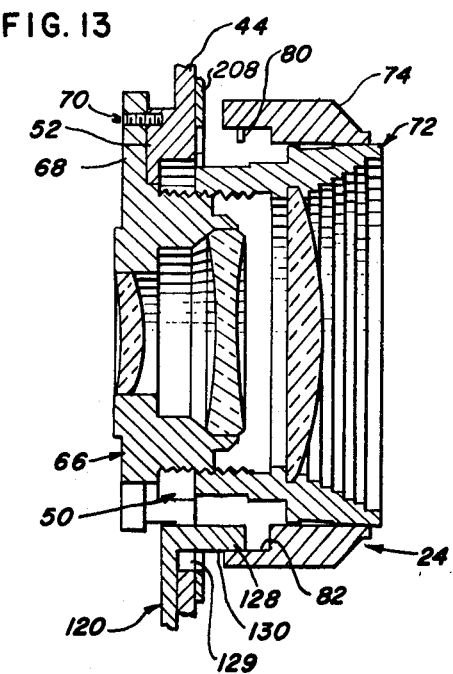
FIG. 13
FIG. 2

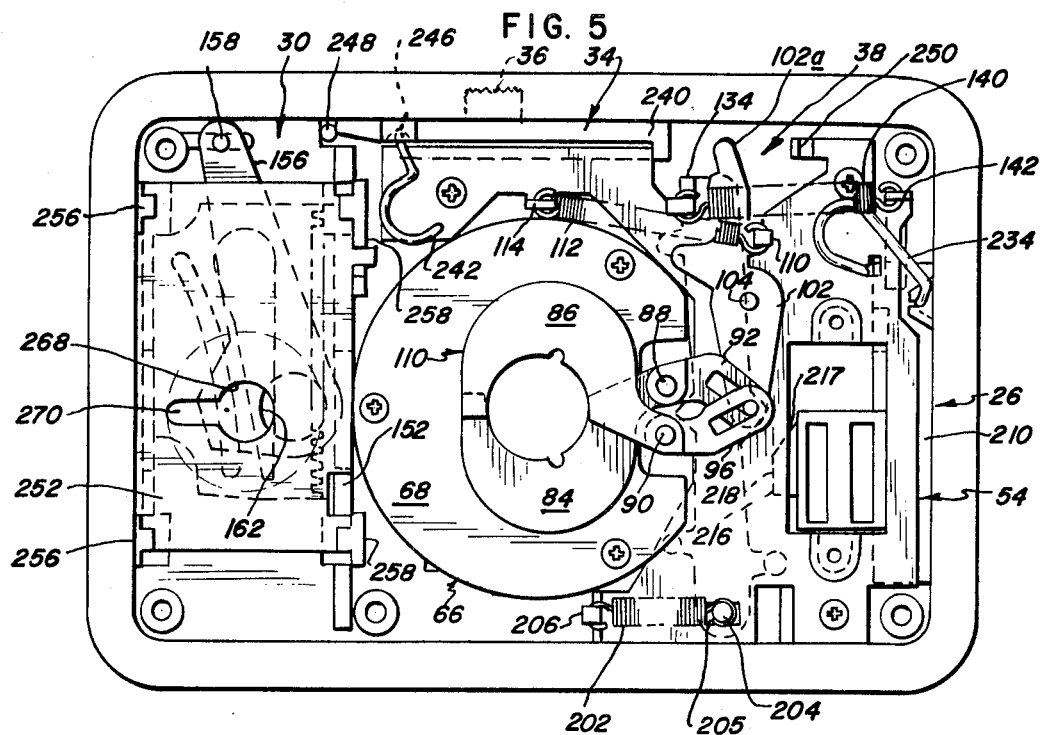
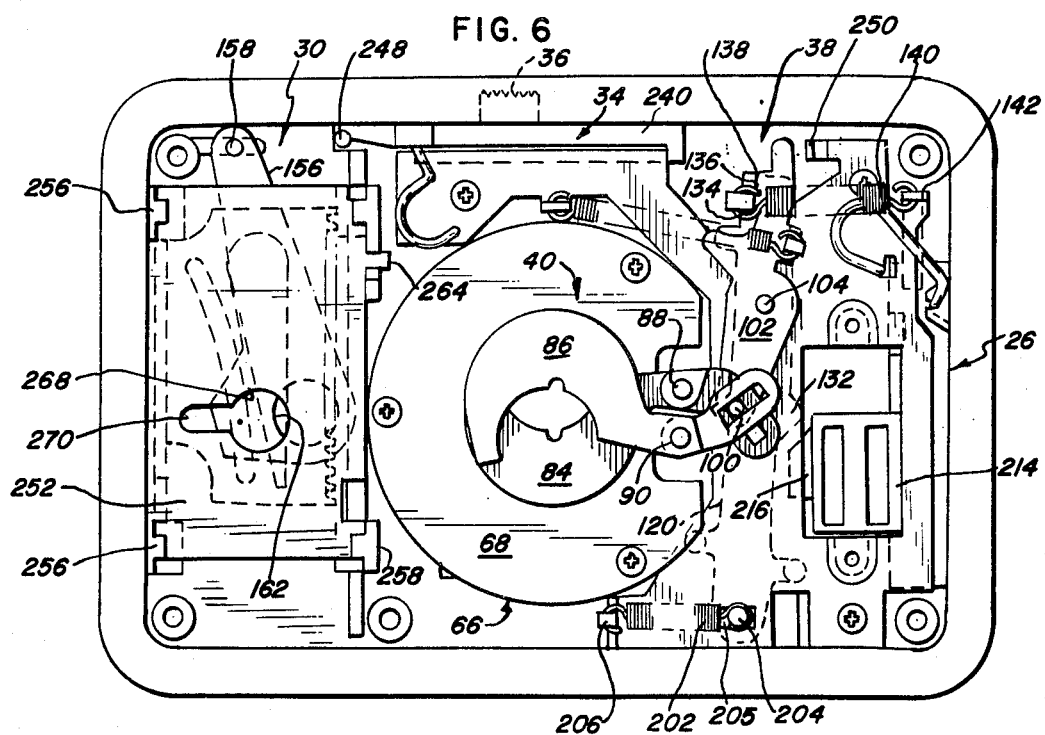

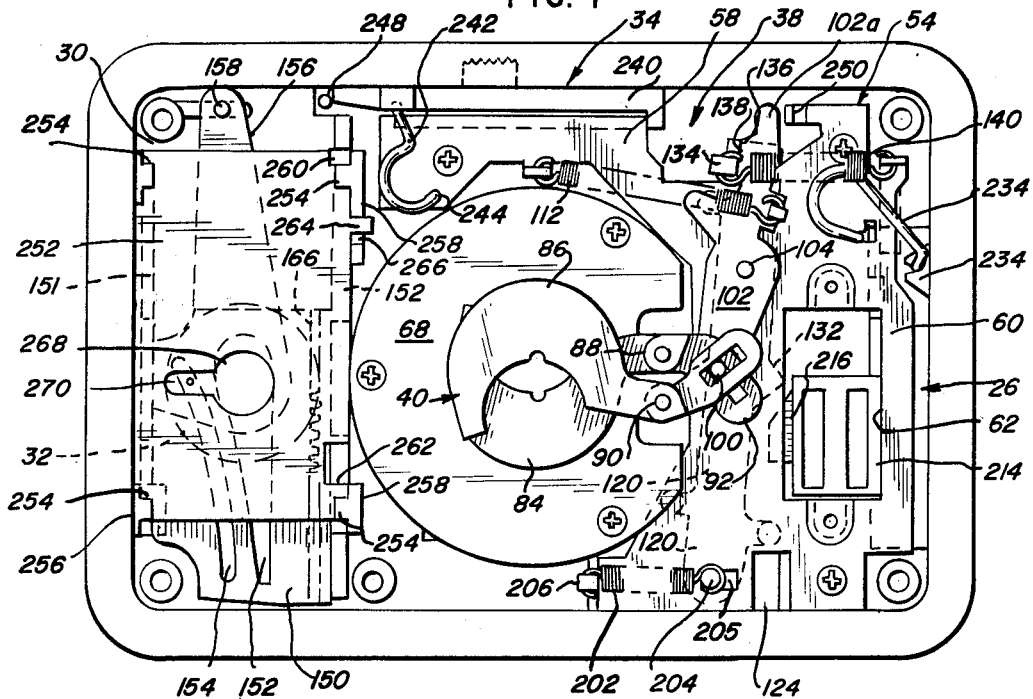
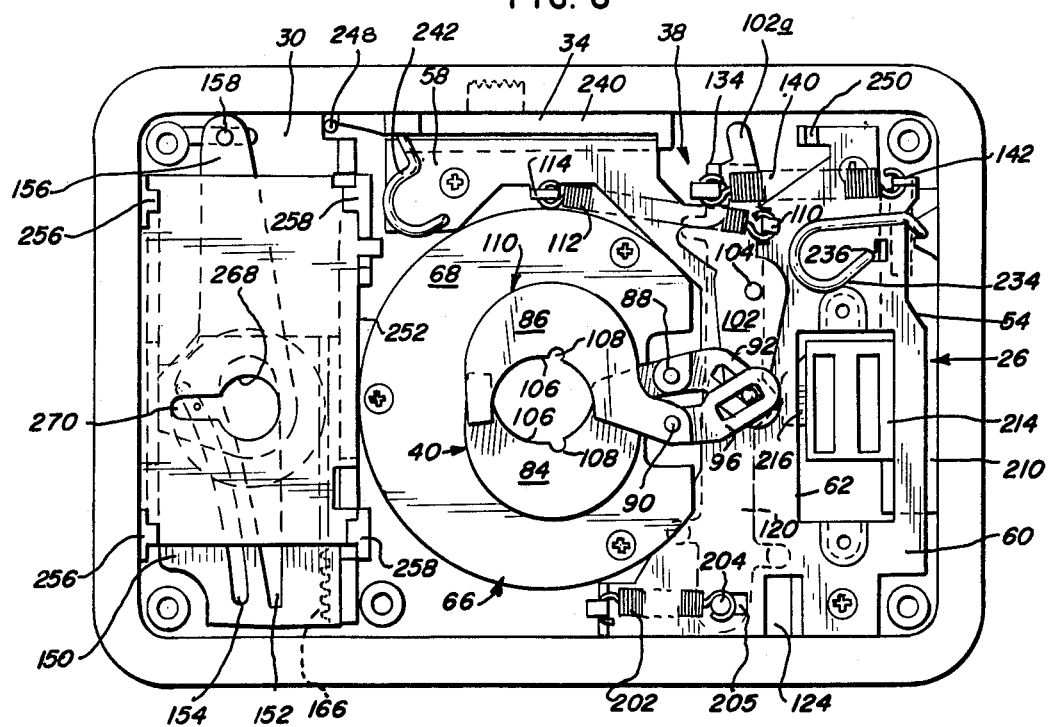

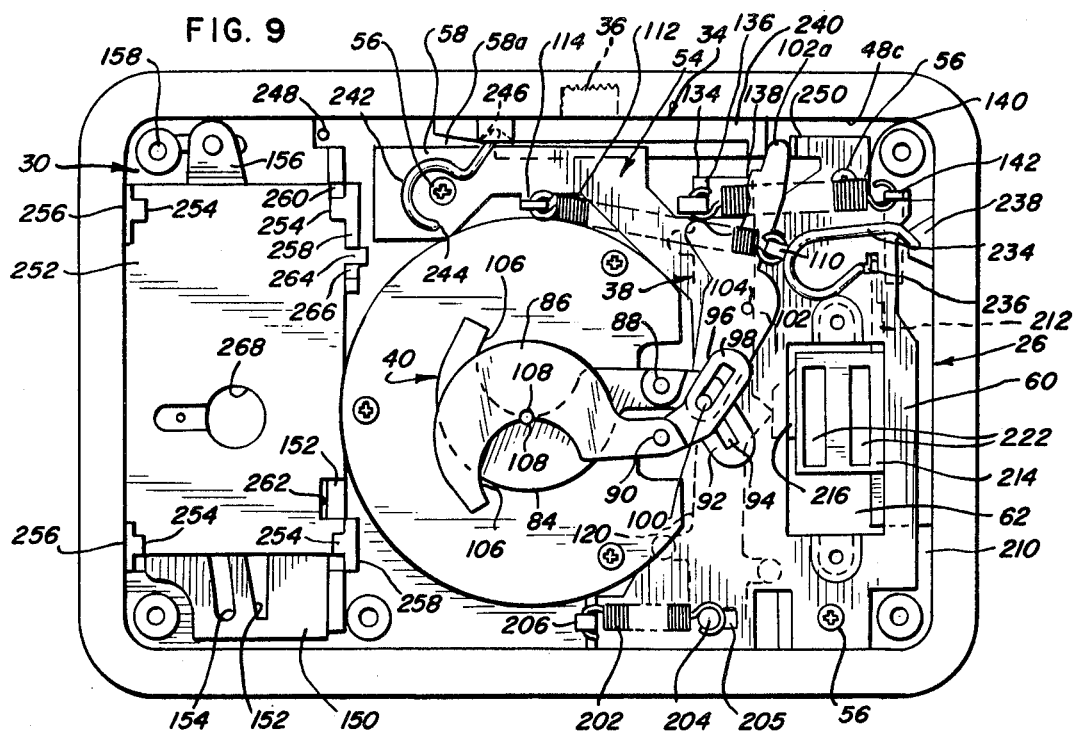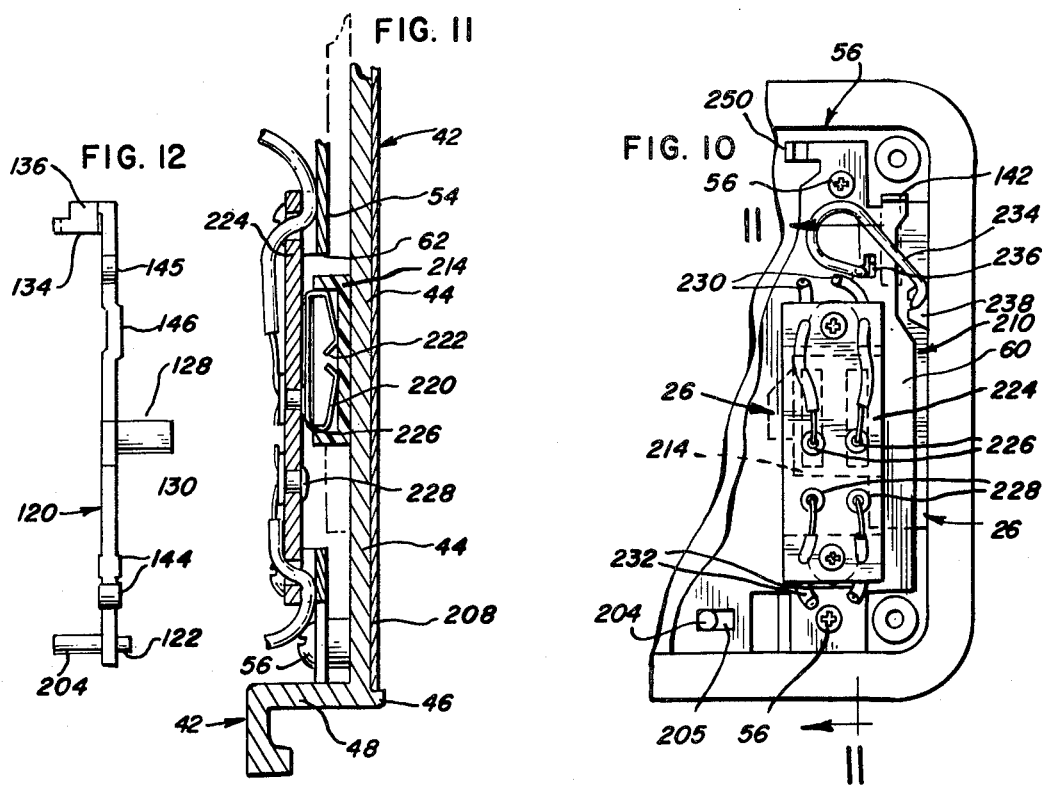

IRIS CONTROL

This is a division of application Ser. No. 296,591 filed Oct. 11, 1972 now abandoned.

This invention relates to exposure control mechanisms in cameras, and more particularly to an improved iris configuration, an improved image brightness control apparatus, and controls for automatically adjusting the iris diaphragm to the proper opening under various camera operational settings.

As is well known, the light aperture through a camera lens must be determined in coordination with three interrelated factors of shutter speed, film speed and the lighting conditions under which a particular exposure is to be made. These factors can vary widely, e.g., as between automatically controlled shutter speeds or manual speed settings over a wide range, as between moderate speed films of the types now commonly used for color photography and higher speed films widely used for black and white pictures, and as between outdoor sunlight conditions and indoor flash-lighted conditions. It is highly desirable that the exposure control mechanism of a camera provide appropriate adjustments to conveniently and accurately compensate for such varying factors.

It is an object of this invention to provide improved mechanisms meeting the aforementioned requirements.

It is another object of this invention to provide an improved camera system affording automatic compensation adjustments of the various interrelated operational parameters, and allowing for different film speeds and for different lighting conditions.

It is an object of this invention to provide an improved iris diaphragm mechanism.

It is a more specific object of this invention to provide an improved simple iris diaphragm which provides accurate control of the aperture at widely different aperture settings.

It is another object of this invention to provide an improved control meachanism for adjusting an iris diaphragm.

It is a more specific object of this invention to provide iris control mechanism which will automatically adjust the iris aperture in accordance with other operational settings of a camera.

It is another object of this invention to provide a camera system which can utilize a flash-lighting unit of essentially uniform output associated with the camera and automatically compensate for the resulting differences in illumination of a subject at various distances from the camera.

It is a further object of this invention to provide a camera with an improved image brightness control mechanism.

It is a further object of this invention to provide improved apparatus meeting the aforestated objects and which is economical to manufacture and assemble and which is reliable in operation.

Further and additional objects and advantages of the invention will be apparent, particularly to those skilled in the art, from the following description, the accompanying drawings and the appended claims.

In carrying out this invention in one illustrative form a camera is provided with a scissors-type iris diaphragm in which each diaphragm blade has an aperture-defining edge of one general configuration for forming a relatively large adjustable aperture and a much smaller notch extending outward from such edge for forming a small secondary aperture when the larger aperture is closed. A linkage arrangement is provided for positioning the diaphragm blades to adjust the iris aperture in accordance with the focus or distance setting and in accordance with a lighten-darken exposure control, at a constant shutter speed. A flash control switch mechanism positions the linkage to permit the aforenoted adjustment of the iris when the switch is "on", and maintains the diaphragm blades at one predetermined aperture setting when this switch is "off". A film speed selector is selectively positioned to permit the aforenoted operation or to override the iris adjustment operation of the linkage and of the flash control switch to maintain the diaphragm blades at another predetermined position. The exposure control also varies the image brightness to an electronic shutter which will automatically vary the shutter speed in accordance with that brightness when the iris is in either of said predetermined positions.

For a more complete understanding of the invention, reference should now be had to the embodiment illustrated in greater detail in the accompanying drawings and described below by way of a specific example of the invention.

In the drawings:

FIG. 1 is a partial perspective view of a camera employing teachings of this invention, showing particularly a front assembly unit which includes various control mechanisms;

FIG. 2 is a rear view of the focusing ring;

FIG. 5 is a rear view of the aforenoted assembly unit fully assembled, except for a part of the flash control switch;

FIGS. 6 and 7 are rear views similar to FIG. 5 with the mechanism in an iris diaphragm adjustment mode and in different adjustment positions;

FIG. 8 is a rear view similar to FIG. 5 with the mechanism in a "flash off" position;

FIG. 9 is a rear view similar to FIG. 5 with the film speed selector locking the iris diaphragm in a predetermined position for higher speed film;

FIG. 10 is a partial rear view of the aforenoted assembly unit, with the flash control switch assembled;

FIG. 11 is an enlarged cross-sectional view taken generally along line 11—11 of FIG. 10 and looking in the direction of the arrows;

FIG. 12 is a side view of the operating arm of the linkage system; and

FIG. 13 is an enlarged center view of the lens and focus mechanism taken generally along line 13—13 of FIG. 1 and looking in the direction of the arrows.

Figure 3:
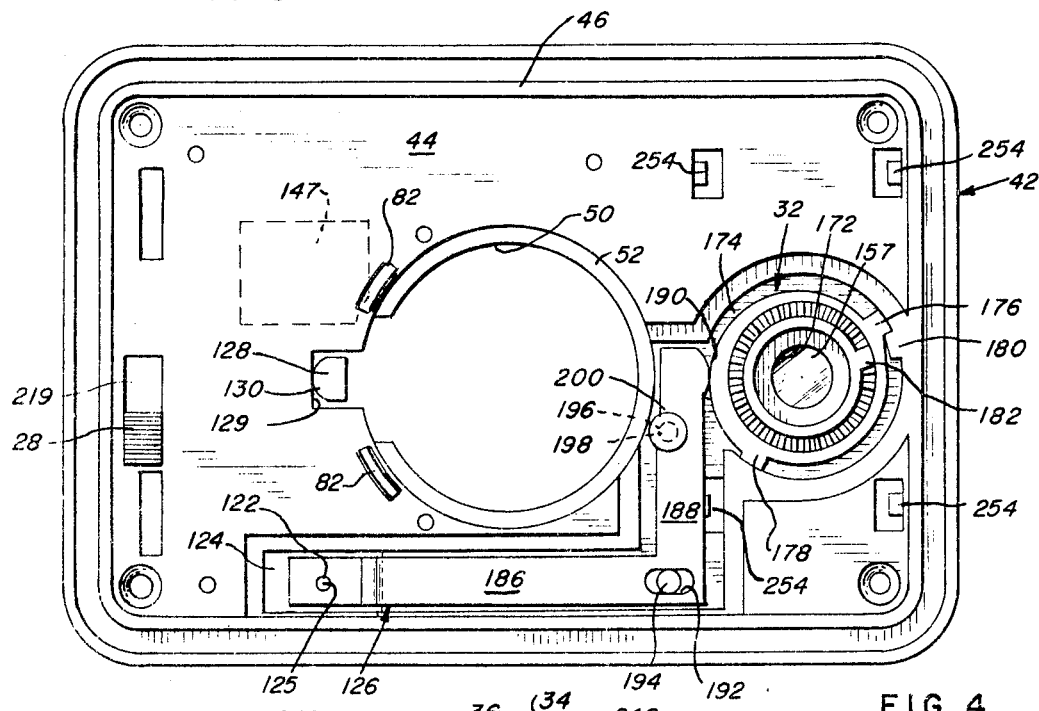
FIG. 3 is a front view of the aforenoted assembly unit partially assembled.

Referring first to FIG. 1, 20 indicates a camera designed for taking pictures of the instant development type. The front assembly unit 22 includes a lens and distance or focus adjustment subassembly 24, a flash control switch unit 26 (FIGS. 4–11) including an operating button 28, an image brightness control assembly 30 (FIGS. 4–9) with an external adjustment knob 32, a film speed selector 34 (FIGS. 4–9) having an operating button 36, and an operating linkage system 38 (FIGS. 5–9) for operating an iris diaphragm 40 (FIGS. 5–9). In addition, the camera 20 will include appropriate related operative components, such as a shutter mechanism and an electronic shutter control including a photocell, integrating circuits and electronic triggering mechanism as disclosed in the copending application of Israel Nesson entitled CAMERA SHUTTER ASSEMBLY filed herewith (Ser. No. 296,678) and a flash lighting unit which may be an electronic flash unit and may be separate from, detachably mounted on or integral with the camera 20, e.g., as disclosed in the copending application of Zvi Karpol entitled ELECTRONIC STROBE filed herewith (Ser. No. 296,628).

Figure 4:
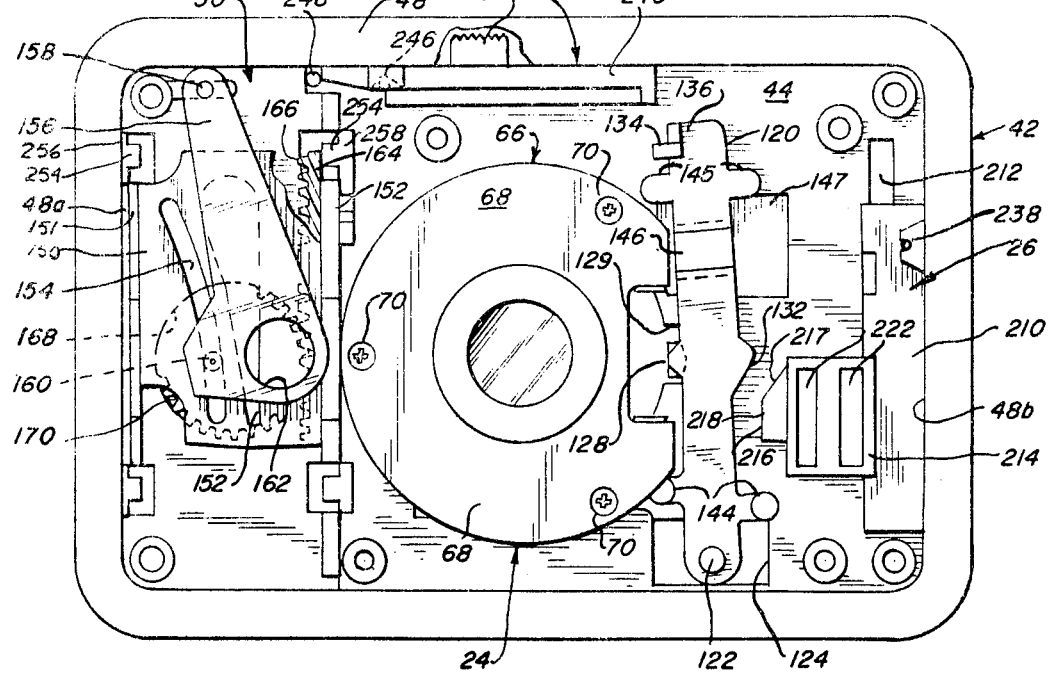
FIG. 4 is a rear view of the aforenoted assembly unit partially assembled.

The various components of the assembly unit 22 referred to above are assembled and supported on a lens mounting plate 42 which is illustrated most clearly in FIGS. 3, 4 and 11. Generally, this mounting plate includes a wall section 44, a shallow fowardly projecting peripheral flange 46, and a rearwardly projecting peripheral flange 48, which, with the wall 44, forms a shallow pan-like receptacle in which various components are mounted. Wall 44 is provided with a central lens receiving opening 50, surrounded by an annular mounting shoulder 52 projecting rearwardly from the wall 44 (see also FIG. 13). The mounting plate 42 further includes appropriate shoulders, bosses, studs, recesses and openings for accommodating the mounting and movement of the various components referred to hereinafter. Referring also to FIGS. 5-9 and 11, a base plate 54 is secured to the mounting plate 42, as by screws 56, and includes an upper arm section 58 and a main plate section 60 having a rectangular opening 62 therethrough. As best seen in FIG. 11, the plate 54 is supported in spaced relation to the wall 44, to permit mounting and movement of some of the linkage components in the space between these plates.

Referring now more particularly to FIGS. 1, 2, 4 and 13, the lens and focusing assembly 24 includes a rear lens unit 66 disposed in the opening 50 and having a rear flange 68 by which the lens assembly is supported on the shoulder 52, as by screws 70 which engage appropriate bosses of the mounting plate 42. An adjustable front lens unit 72 is threadably engaged on the unit 66. The focal length or distance setting of the camera is adjusted by rotating the front unit 72 whereby this threaded engagement causes linear adjustment between the lens components. A focusing ring 74 is disposed in circumannular relationship to the front lens unit 72. The ring 74 is secured to the unit 72 in predetermined calibrated position by appropriate set screws (not shown) and is provided with indicia 76 calibrated to provide a focal distance reading against an appropriate indicia 78 on the camera housing as the front unit and ring are rotated together. A radially inwardly extending pin 80 on the ring engages fixed stops 82 (FIG. 3) on the mounting plate to limit the adjustment movement of the front lens unit and ring 72-74 Referring particularly to FIGS. 2 and 13, the ring 74 is provided with a cam surface 82 eccentric to the axis of rotation of the front lens unit 72 for adjusting the aperture setting of the iris diaphragm 40 through the linkage system 38.

Referring now to FIGS. 4-9, the iris diaphragm mechanism 40 includes a pair of scissor leaves or blades comprising a lower leaf 84 and an upper leaf 86. The leaf or blade 84 is pivotally mounted on a pin 88 which extends upwardly from the plate 54, while upper leaf 86 is similarly mounted on a pin 90. Leaf 84 includes a tail section 92 formed with an elongated slot 94 on the side of the pin 88 opposite the leaf 84 and extending at an angle as illustrated. Leaf 86 includes a similar tail section 96 and an elongated slot 98. The slots 94 and 98 extend in intersecting relationship and both engage a pin 100 which extends upwardly through these two slots from an underlying operating lever 102. The lever 102 is pivotally mounted on a pin 104 secured to the plate 54. It will be appreciated that reciprocating movement of the pin 100 toward and away from the line joining the center lines of pins 88 and 90 will effect scissors movement of the blades 84 and 86 for adjusting the aperture or lens opening defined by these blades.

Each blade 84 and 86 is provided with an arcuate aperture-defining edge 106 of a relatively large radius, e.g., corresponding generally to the radius of the maximum lens opening through the lens subassembly 24. As the two blades 84 and 86 are pivoted about pins 88 and 90, the edges 106 define an effective lens aperture of varying area, as illustrated generally by the changes of position shown in FIGS. 5-8. Each of the blades 84 and 86 is further provided with a small notch 108 extending outwardly from the respective edge 106 (inwardly of the body of the end portions of the blades). The notches 108 are arcuate and are positioned to complement one another in forming a very small aperture in coaxial alignment with the lens assembly 24 when the blades 84 and 86 are positioned to close the aperture defined by the edges 106, as illustrated in FIG. 9. It will be appreciated that as the blades 84 and 86 are moved to a closed position, for forming small apertures, the edges 106 will tend to form an elongated aperture approaching a slit configuration, rendering accurate control very difficult at very small aperture settings. By providing the small notches 108, a small aperture may be formed accurately under one mode of operation while also providing the edges 106 of a larger configuration for forming substantially larger adjustable lens openings. By way of one more specific example, blades 84 and 86 have been provided in which the the edges 106 define an arc of 0.217 inch radius, and the notches 108 are 0.031 inch radius, the notches 108 thus being of less transverse dimension than the edges 106 by a factor of 7.

The lever 102 is pivoted about its midsection on pin 104, with the operating pin 100 for the iris diaphragm being near one distal end. The opposite end section 102a includes an upwardly extending hook 110 which is engaged by a tension spring 112 having its opposite end secured to an upwardly extending tab 114 on the plate arm 58. The tension spring 112 tends to rotate the lever 102 in a counterclockwise direction as seen in FIGS. 5-9, and thereby tends to maintain the iris diaphragm leaves in the open position illustrated in FIGS. 5 and 8.

The linkage system 38 includes a cam-following operating arm 120 which is shown most clearly in FIGS. 4 and 12 and indicated partially in dashed lines in various positions in FIGS. 5-9. The arm 120 includes a pin 122 at its lower end. The pin 122 extends through an opening 124 in the wall 44 and engages an opening 125 of a slide bar 126 (FIG. 2) for pivotally and adjustably mounting the bar 120. The arm 120 also includes a cam follower finger 128 which projects forwardly from the midportion of the arm through a slot 129 in wall 44, see also FIGS. 3 and 13. The finger 128 is provided with an outer cam follower surface 130. As seen most clearly in FIG. 13, the finger 128 projects into the annular space between the outer perimeter of the forward lens unit 72 and the surrounding focusing ring 74, with the cam follower surface 130 engaging the cam surface 82 of the follower ring, whereby the cam surface 82 will cause arm 120 to pivot about the axis of pin 122 as the focus ring 74 is rotated about its axis. Arm 120 further includes a cam shoulder 132 in its midsection area, for engaging by the switch mechanism 26 as will be described further below. Adjacent its distal end, the arm 120 is further provided with an upstanding tab 134 including an abutment surface 136 disposed in opposed relationship to an abutment surface 138 adjacent the upper distal end of lever 102 as seen particularly in FIGS. 5-9. A tension spring 140 has one end connected to the upper end of tab 134 and its opposite end connected to an upstanding tab 142 on the plate 54. Thus the spring 140 biases the arm 120 in a clockwise direction as seen in FIGS. 4-9, and maintains the cam finger 128 in constant following contact with the cam surface 82 of the follower ring 74. Further, it will be appreciated that when the abutting surfaces 136 and 138 of the arm 120 and lever 102 are in contact with one another, as in FIG. 6, the spring 112 and movement of the arm 120 will cause pivotal movement of the lever 102 with the arm 120, and hence adjustment movement of the blades 84 and 86 through the drive pin 100. Arm member 120 also includes lateral extensions 144 and 145, and an offset 146 which is received in a recess 147 in wall 44 (see FIG. 4), to provide bearing, guiding and stabilizing support for the arm 120 and connected mechanism.

The exposure control mechanism 30 includes a slide vane member 150 confined for vertical reciprocating motion between a rib 151 adjacent end flange 48a of the mounting plate 42 and a spaced parallel rib 152, both ribs being on wall 44. The slide vane or plate 150 is provided with an elongated tapered opening 152 and a generally parallel cam slot 154. A second vane 156 is pivotally mounted on a pin 158 fixed to the mounting plate 42 and carries a pin 160 which engages the cam slot 154. An opening 162 is provided in the vane 156 in a position to provide varying degrees of overlap with the slot 152 as the vane 156 is moved laterally across plate 150, due to the engagement of pin 60 in slot 154, when the plate 150 is reciprocated. The mechanism 30 thereby provides an opening of variable area in alignment with a lens 157 in the knob 32 for regulating the passage of light to a photocell of an electronic shutter mechanism of the type alluded to above. This varies the brightness of the image of a subject on such a photocell to thereby effect compensating adjustments in the shutter timing.

Referring particularly to FIG. 4, a depending flange 164 on the vane member 150 is provided with a rack of teeth 166 which overlie a peripheral segment of an opening 168 through the wall 44. The control knob 32 is journaled in this recess and is provided with a set of gear teeth forming a pinion 170 which engages the rack 166 to reciprocate the plate 150 as the knob 32 is rotated. The knob 32 is provided with an axial lens opening 172 in which the lens 157 is mounted. Rotation of the knob 32 thus effects adjustment of the brightness of the image to the electronic shutter and thereby changes the shutter setting to "lighten" or "darken" a picture taken with the camera, assuming other conditions remain constant.

Referring now particularly to FIG. 3, the knob 32 is provided with an edge cam 174 extending circumferentially between a pair of ears 176 and 178. These ears are in coplanar opposed relationship to a stop tab 180 on the plate 42 to limit the rotational adjustment of the knob 32. An index bar 182 passes over indicia 184 (FIG. 1) to indicate the adjustment setting of the image brightness control mechanism.

With continuing reference to FIG. 3, the slide bar 126 is L-shaped, including a horizontal leg 186 which includes the aperture 125 for receiving the pin 122 of arm 120, and a vertical leg 188 provided with a cam follower surface 190 which engages the edge cam 174. The legs are received in shallow recesses in the front of wall 44 as shown. An elongated opening 192 is provided through the slide bar 126, and is oriented generally parallel to the horizontal arm 186. This opening 192 is engaged over a guide pin 194 affixed to the wall 44. The upstanding arm 188 is provided with a slot 196 which slidably engages a pin 198. Pin 198 also is affixed to wall 44 and is provided with an enlarged head flange 200 which overlies the portion of arm 188 immediately adjacent the slot 196. Referring also to FIGS. 5-9, a further tension spring 202 has one end secured to a pin 204 which is provided on the lower end of arm 120 and extends rearward through an opening 205 in plate 54. The opposite end of spring 202 is secured to an upstanding tab 206 on the plate 54. The spring 202 urges the lower end of the arm 120 as well as the slide bar 126 to the left as seen in FIGS. 4-9, and to the right as seen in FIG. 3. Thus the slide bar 126 is mounted and constrained for sliding lateral movement, to the right and left as seen in FIG. 3, under the impetus of spring 202 and as dictated by the movement and position of cam 174 as the knob 32 is rotated. Moreover, it will be appreciated that such movement has the effect of changing the position of the lower pivot axis of the arm 120 and, assuming other conditions are held constant, concomitantly adjusting the position of guide pin 100 and hence the aperture setting of the iris blades 84 and 86.

The slide bar 126 is further retained in the final assembly by a front cover sheet 208 which overlies the front surface of the wall 44 within flange 46 as seen in FIGS. 1 and 11. The cover sheet 208 also retains the knob 32 in its journaled position in opening 168 and carries the various indicia as shown. The sheet 208 is suitably attached to the front surface of the wall 44 by any suitable means, such as by adhesive attachment.

The switch mechanism 26 includes a slide element 210 mounted for vertical reciprocating movement along the end flange 48b. The member 210 is guided for such movement by the engagement of the element with the wall 48b as well as by a protuberance (not shown) on its underside which engages a slot 212 in wall 44 and by engagement of a contactor receiving section 214 with the edge of the aperture 62 in plate 54. The element 210 is further provided with a shoulder 216 providing a ramp cam surface 217 and an outer surface 218 positioned for engagement with the cam surface 132 on arm 120. The element 210 is moved along its reciprocating path by manipulation of the button 28 which projects forward through an opening 219 in wall 44.

Referring to FIGS. 10 and 11, a spring-type slide contactor 220 is mounted in each of a pair of parallel elongated recesses 222 in the section 214. An electrical terminal strip 224 is positioned over the path of reciprocation of the section 214. The strip 224 is provided with two pairs of contactor pins 226 and 228 having electrical leads 230 and 232 connected thereto. The pins 226 and 228 are positioned such that one pin of each pair is contacted by a contactor 220 when the slide element 210 is in its lower or "flash on" position, to complete the flash enabling circuit so that a flash unit may be triggered by appropriate mechanism when the shutter is actuated, and to set the electronic shutter control for a fixed predetermined shutter speed. When the slide member 210 is in its upper position as in FIG. 11, the contactors 220 are out of contact with at least one set of the contact pins to open the flash-enabling circuit and to return the shutter to automatic control.

Referring now more particularly to FIGS. 5–9, when the slide element 210 is in its lower position, the cam shoulder element 216 is disengaged from the cam 132, whereby the operating arm 120 is free for adjustment of the iris mechanism in accordance with the other control inputs. However, when the slide element 210 is moved to its upper position, the cam surfaces 217 and 218 engage cam surface 132 to move the arm 120 to the left as seen in FIGS. 4–9, and thereby to move the iris blades to the fully open position regardless of the position of the focus ring cam 82. When element 210 is in its upper position of FIG. 8, the outer shoulder 218 locks the arm 120 in the position shown in FIG. 8. A toggle spring 234 is connected between a slot 236 in plate section 60 and a notched segment 238 on the slide element 210 to provide an over-center snap action for positively positioning the element 210 in either of its end positions of sliding movement.

The selector 34 comprises a slide member 240 confined between the adjacent top flange 48c and the adjacent edge 58a of the arm section 58. The operating button 36 for sliding the member 34 between its end positions projects outwardly through an opening 241 in the flange 48c. An over-center toggle spring 242 is engaged in an opening 244 in arm section 58 and a recess 246 in the slide member 240 to provide positive positioning of the slide member in either extreme of its sliding movement. A pin stud 248 attached to the wall 44 limits movement of the slide 240 to the left as seen in FIGS. 4–9. When the selector member 34 is moved to the right as seen in these figures, it engages the distal end section of arm 102a and pivots the arm 102 about pin 104 to an end position wherein the end 102a abuts an upstanding flange 250 on the plate 54. As shown in FIG. 9, this results in movement of the pin 100 to the left to move the iris diaphragm blades 84 and 86 to the closed position wherein the recesses 108 define the lens aperture. Moreover, the iris diaphragm components will be moved to this position by the selector 34 regardless of the position of the other control components operative on arm 120 and the iris diaphragm elements.

The mechanism described above is designed to accommodate operation of a camera with a film of a moderate predetermined speed, such as a color film, and another film with a speed many times faster than the first one. When using the moderate speed film, the selector 34 is set in its left-hand position as viewed in FIGS. 4–9, which permits the iris diaphragm components to move to a fully-opened position, subject to control by the other control components described herein. When the selector 34 is moved to its right-hand position, it moves the iris diaphragm closed, to its minimum size as defined by recesses 108, and will maintain the diaphragm blades in that position regardless of the movement of the other control elements. By way of example, under such conditions, the film exposure would be under the control of an electronic shutter mechanism set at a constant speed when the flash control 26 is "on", and when control 26 is "off" operating in an automatic speed control mode controlled by the brightness of the image passed to the sensing mechanism through the control apparatus 30.

Referring again to the image brightness control 30, and particularly to FIGS. 4, 7 and 9, the plates or vanes 150 and 156 are maintained in their respective movable positions by an overlying spring plate 252. The plate 252 rests on ribs 151 and 152, and its corners are engaged beneath lip sections 254 of posts 256 and 258 affixed to wall 44. The plate 252 is generally rectangular and of a spring configuration tending to bow forward toward ribs 151 and 152 in its midsection, thereby insuring close sliding contact between the vanes 150 and 156 in all positions of their movement. A corner notch 260 and a side notch 262 permit engagement of the plate over the respective lips of posts 258 after the opposite edge is engaged between rib 151 and the lips on posts 256 in assembling the apparatus. Thereafter, the adjacent corners are pressed forward, and the plate is slid upward to engage the respective adjacent portions beneath the lips of posts 258. A spring tab 264 snaps into a recess between the upper post 258 and a protuberance 266 to retain the plate 252 in the assembled position. An opening 268 through plate 252 is aligned with the lens 157 in knob 32 to permit passage of light from the subject through the plate, as determined by the degree of overlap of intervening openings 152 and 162. A slot 270 accommodates the upper end of the attachment for pin 160.

In the overall operation of the described embodiment, with the selector 34 set for moderate speed film and the switch mechanism 26 in the "on" position, as in FIGS. 5–7, the electronic shutter control will be set to operate the shutter at a fixed predetermined speed and the iris diaphragm drive mechanism 38 will be positioned to adjust the iris aperture in accordance with the focus or distance setting of the focusing ring 74 subject to modification in accordance with the setting of the brightness or "lighten-darken" mechanism 30. The brightness of the image of a subject received by a camera under artificial lighting bears a known relationship to the distance (inversely proportional to the square of the distance) of the subject from the camera. The cam 82 and the drive linkage system to the iris diaphragm leaves 84 and 86 are proportioned accordingly, such that adjustment of the focus ring to focus on the subject at a given distance, within effective artificial lighting range, will make appropriate compensating adjustment in the lens aperture formed by the blades 84 and 86 to obtain the proper brightness of image on the film in the camera for the predetermined shutter speed setting and film speed, e.g., as in FIGS. 5 and 6. The iris setting thus obtained can be further modified in accordance with variations in the film and other factors by adjustment of the mechanism 30 in the usual manner of adjusting the "lighten-darken" control, e.g., as in FIG. 7. Thus, the lens aperture is automatically compensated for artificial lighting (flash) operation.

When the control switch 26 is moved to the "off" position, and with selector 34 set for moderate speed film, the iris mechanism is moved to the large aperture or a fully open position as in FIG. 8 for exposure of the film under the control of the electronic shutter mechanism in the same manner as previously described for high speed film. It will be appreciated that the cam-operating arrangement provided between the switch mechanism 26 and the arm 120 will insure movement of the iris mechanism to this predetermined position and maintain it in that position regardless of the adjustment setting of the focus control ring or the brightness control mechanism 30, thus overriding the effectiveness of those controls. On the other hand, moving the switch 26 to the "on" position will automatically return the iris mechanism to any position then called for by the setting of the focus control and the brightness control apparatus.

In summary, with the selector 34 set for moderate speed film and the switch 26 in an "on" position, the electronic circuit for the flash control is activated and the linkage between the lens focusing ring and the iris mechanism as well as between the brightness control apparatus 30 and the iris mechanism is activated for automatic adjustment of the iris opening. The shutter is set at a predetermined speed for this operation. If the control switch 26 is then moved to the "off" position, the iris diaphragm automatically is moved to a fully opened position and the control linkages from the focus control and the brightness control are overriden. Furthermore, if the selector 34 is moved to the right-hand or high speed film position, the iris diaphragm is moved to the small opening position of FIG. 9 and the iris control effects of the switch 26, the focusing ring and the brightness control are overridden. Thus the desired conditions of operation are obtained automatically in accordance with the usual control adjustments of the camera in terms of the film to be used and the type of operation anticipated, with the iris adjustment being provided automatically under flash operation with moderate speed film. Moreover, the lighten-darken control is provided by manual adjustment of knob 32 in all modes of operation where this type of adjustment is effective.

It will thus be seen that an iris diaphragm and control mechanism have been provided which meet the aforestated objects.

While a particular embodiment of this invention is illustrated and/or described herein, it will be understood, of course, that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. Mechanism for controlling the brightness of an image passing through an aperture and along a predetermined axis, comprising a first vane member movably mounted for reciprocating movement along a predetermined substantially linear path, said member having an elongated opening located to move longitudinally over said aperture as said first member is reciprocated along said linear path, a movable second vane member having an opening therethrough, and means for moving said second vane member along another path transverse to said linear path in response to the reciprocal movement of said first vane member, thereby effecting movement of said opening defined by said second vane member across said aperture in a direction transverse of said elongated opening in said first vane member as said first vane member and its associated elongated opening moves longitudinally over said aperture.

2. Mechanism as in claim 1 wherein said elongated opening is of varying width over its length.

3. Mechanism as in claim 1 wherein said first member is formed with a narrow slot extending at an angle to the path of reciprocation of said first member, said second member being pivotally attached at one end and having a cam follower engaging in said slot to effect transverse movement of said second member as said first member is reciprocated.

4. Mechanism as in claim 3 including a rotatable member having a lens therein to direct an image through the overlapping openings in said first and second vane members disposed along said axis, and means for reciprocating said first vane member in response to rotation of said rotatable member.

5. Mechanism as in claim 1 wherein said second vane member is interconnected with said first vane member to so move the opening in said second vane member across said aperture in a direction transverse to said elongated opening as said first member is reciprocated.

* * * * *